Jan. 31, 1933.  H. JUNGHANS  1,895,666

ANCHOR ESCAPEMENT FOR CLOCKS AND THE LIKE

Filed March 5, 1932

INVENTOR:

Patented Jan. 31, 1933

1,895,666

UNITED STATES PATENT OFFICE

HELMUT JUNGHANS, OF SCHRAMBERG, WURTEMBERG, GERMANY

ANCHOR ESCAPEMENT FOR CLOCKS AND THE LIKE

Application filed March 5, 1932, Serial No. 596,997, and in Germany May 22, 1931.

My invention relates to an anchor escapement for clocks and the like provided with two escapement wheels mounted on the same spindle and having the same pitch of tooth but oppositely directed lifting planes, and with only one anchor pin engaging alternately with one or the other of said wheels. The essential feature of this escapement consists in that the two escapement wheels are provided so that they have limited rotation with respect to each other and are coupled together by such means as a spiral spring so that the teeth of one wheel are opposite to the wider gaps between the teeth of the other wheel. The anchor pin engaging alternately with one or the other escapement wheel causes the two escapement wheels to rotate with respect to each other alternately in one or the other direction, so that the coupling spring is stretched or released respectively and that every tooth of one wheel joins alternately one or the other of the two adjacent teeth of the other wheel. The anchor pin is therefore always guided by one lifting plane of one wheel to the joining locking plane of the other wheel; thus it is guided almost continuously and gently.

The rotation of the two escapement wheels with respect to each other is limited by one or the other of two springs attached to one wheel striking alternately against a pin covered with a sound dampening material provided on the other wheel. Thus the recoil of the escapement wheels is not absorbed by their teeth and the anchor pin but by the springs and the pin referred to.

Owing to this construction the ticking, which in the known escapements having two anchor pins and only one wheel is caused by the impact of the teeth of this wheel against the anchor pins occurring on the recoil of the escapement wheel, is almost entirely eliminated. Furthermore together with the second anchor pin also the requirement of the exact positioning of the two anchor pins with respect to the anchor spindle is spared.

Figure 1:
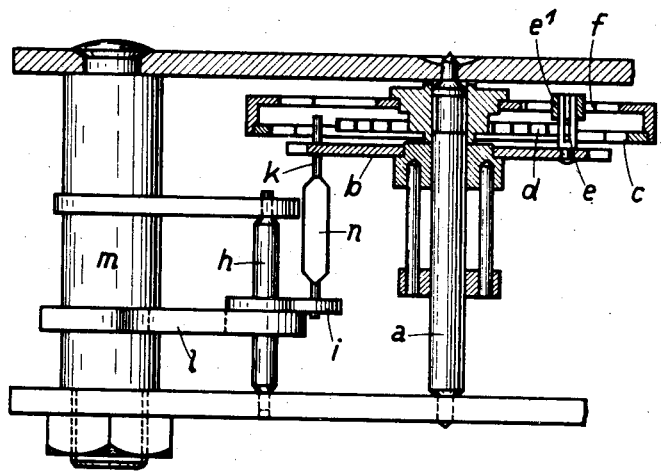
Figure 2:
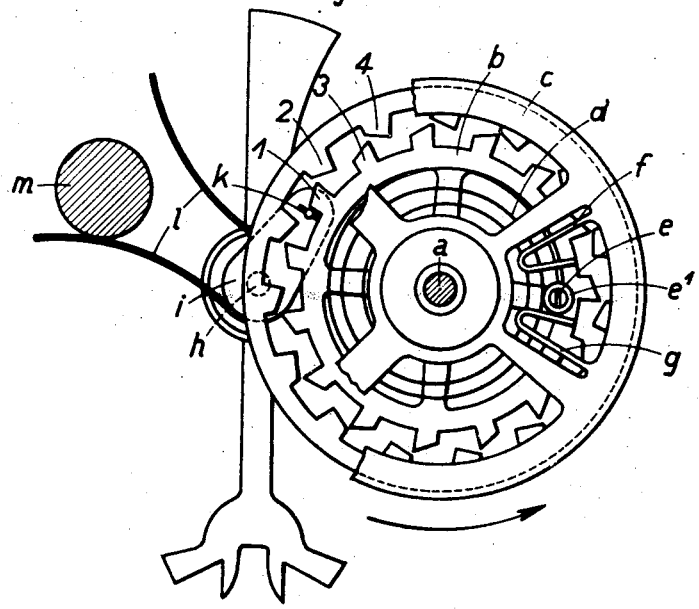

In the accompanying drawing which illustrates my invention and forms part of this specification, Figure 1 is a side elevation of the escapement partly in section, and Figure 2 is a corresponding plan.

On the escapement wheel spindle $a$ is fixedly mounted the usual externally toothed escapement wheel $b$ and is loosely mounted the larger internally toothed escapement wheel $c$. Both the wheels have the same pitch of tooth, but their lifting planes are oppositely directed. The teeth of one wheel are opposite to the wider gaps between the teeth of the other wheel. Both the wheels are coupled by a spiral spring $d$, of which the inner end is secured to the wheel $c$ and the outer end to a pin $e$ mounted on the wheel $b$. The upper part of this pin is covered with rubber or any other sound dampening material $e^1$ and engages with certain play between two spring hooks $f$ and $g$ secured to the wheel $c$. The anchor $i$, which is mounted on the spindle $h$, has only one arm and carries only one pin $k$, which pin, while the anchor $i$ is swinging, engages alternately with one or the other of the wheels $b$ and $c$.

In the position shown in Figure 2 the anchor $i$ is about to swing outwardly so that its pin $k$ disengages from the wheel $b$ and engages with the wheel $c$. Immediately this pin slips off from the radial locking plane of the tooth 1 of the wheel $b$, the wheels $b$ and $c$ commence to rotate in the direction of the arrow, the pin $k$ being driven by the lifting plane of the tooth 1 and gently guided as far as the tooth 2 of the wheel $c$ joining the tooth 1. When the pin $k$ comes to rest against the radial locking plane of the tooth 2, the wheel $c$ is stopped, while the wheel $b$ continues to rotate, so that the tooth 2 moves away from the tooth 1 and joins the tooth 3, and that the spring $d$ is stretched. This rotation of the wheels $b$ and $c$ with respect to each other is stopped by the resilient hook $f$ striking against the pin $e$.

The anchor $i$ now swings inwards, so that its pin $k$ disengages from the wheel $c$ and re-engages with the wheel $b$. As soon as the pin $k$ slips off from the radial locking plane of the tooth 2, the wheel $c$ again rotates in the direction of the arrow, the pin $k$ being driven by the lifting plane of the tooth 2 and guided gently as far as the tooth 3 of the wheel $b$ joining the tooth 2. When the pin $k$ comes to rest against the radial locking plane of the tooth 3, the wheel $b$ is stopped, while the wheel $c$ continues to rotate, so that the teeth 2 and 4 of this wheel again join the teeth 1 and 3 of the wheel $b$ respectively, and that the spring $d$ is released. This rotation of the wheels $b$ and $c$ with respect to each other is stopped by the resilient hock $g$ striking against the pin $e$. Thereupon the full cycle of operations is repeated.

The oscillations of the anchor $i$ are limited by one or the other of two leaf springs $l$ secured to the hub of the anchor striking against the frame pillar $m$, before the pin $k$ reaches the tooth gullet of the wheels $b$ and $c$. This limitation can be changed by bending the springs $l$ just as that of the rotation of the wheels $b$ and $c$ with respect to each other can be changed by bending the spring hocks $f$ and $g$. The pin $k$ is cut down to form a flat face at $n$, so that when the teeth of the wheels $b$ and $c$ strike against the pin $k$ the latter can give in the direction towards the anchor spindle $h$ and thus the impact becomes more gentle and the noise of the impact is dampened.

What I claim as my invention and desire to secure by Letters Patent is:

1. In an anchor escapement for clocks and the like, the combination of an escapement wheel spindle, two escapement wheels mounted on said spindle, one fixedly and the other loosely, one of said wheels being externally toothed and the other being larger and internally toothed, said wheels having the same pitch of tooth but oppositely directed lifting planes, the teeth of one of said wheels being opposite to the wider gaps between the teeth of the other wheel, means resiliently coupling together said wheels, an oscillating anchor, and a pin carried by said anchor and adapted to engage alternately with one or the other of said wheels.

2. In an anchor escapement for clocks and the like, the combination of an escapement wheel spindle, two escapement wheels mounted on said spindle, one fixedly and the other loosely, one of said wheels being externally toothed and the other being larger and internally toothed, said wheels having the same pitch of tooth but oppositely directed lifting planes, the teeth of one of said wheels being opposite to the wider gaps between the teeth of the other wheel, a spiral spring coupling together said wheels, an oscillating anchor, and a pin carried by said anchor and adapted to engage alternately with one or the other of said wheels.

3. In an anchor escapement for clocks and the like, the combination of an escapement wheel spindle, two escapement wheels mounted on said spindle, one fixedly and the other loosely, one of said wheels being externally toothed and the other being larger and internally toothed, said wheels having the same pitch of tooth but oppositely directed lifting planes, the teeth of one of said wheels being opposite to the wider gaps between the teeth of the other wheel, means resiliently coupling together said wheels, means limiting the rotation of said wheels with respect to each other, an oscillating anchor, and a pin carried by said anchor and adapted to engage alternately with one or the other of said wheels.

4. In an anchor escapement for clocks and the like, the combination of an escapement wheel spindle, two escapement wheels mounted on said spindle, one fixedly and the other loosely, one of said wheels being externally toothed and the other being larger and internally toothed, said wheels having the same pitch of tooth but oppositely directed lifting planes, the teeth of one of said wheels being opposite to the wider gaps between the teeth of the other wheel, a spiral spring, the ends of said spring being secured to one or the other of said wheels respectively, resilient parts provided on one of said wheels, a pin provided on the other of said wheels and engaging with certain play between said two resilient parts, an oscillating anchor, and a second pin carried by said anchor and adapted to engage alternately with one or the other of said wheels.

5. In an anchor escapement for clocks and the like, the combination of an escapement wheel spindle, two escapement wheels mounted on said spindle, one fixedly and the other loosely, one of said wheels being externally toothed and the other being larger and internally toothed, said wheels having the same pitch of tooth but oppositely directed lifting planes, the teeth of one of said wheels being opposite to the wider gaps between the teeth of the other wheel, a spiral spring, the ends of said spring being secured to one or the other of said wheels respectively, two spring hooks provided on one of said wheels, a pin provided on the other of said wheels, the end of said pin being covered with sound dampening material and engaging with certain play between said two spring hooks, an oscillating anchor, and a second pin carried by said anchor and adapted to engage alternately with one or the other of said wheels.

In testimony whereof I affix my signature.

HELMUT JUNGHANS.